United States Patent [19]

Lehner et al.

[11] Patent Number: 5,777,834
[45] Date of Patent: Jul. 7, 1998

[54] SAFETY SWITCH ARRANGEMENT

[75] Inventors: Werner Lehner, Groebenzell; Hermann Haberer; Paul Hartl, both of Munich, all of Germany

[73] Assignee: Leuze electronic GmbH+Co., Owen-Teck, Germany

[21] Appl. No.: 732,456

[22] PCT Filed: Feb. 24, 1996

[86] PCT No.: PCT/EP96/00769

§ 371 Date: Nov. 4, 1996

§ 102(e) Date: Nov. 4, 1996

[87] PCT Pub. No.: WO96/28769

PCT Pub. Date: Sep. 19, 1996

[30] Foreign Application Priority Data

Mar. 11, 1995 [DE] Germany .......... 195 08 841.7

[51] Int. Cl.$^6$ .......... H02H 3/00
[52] U.S. Cl. .......... 361/66; 361/86
[58] Field of Search .......... 361/54, 55, 56–58, 361/78, 79, 66, 86, 87, 100; 307/21, 25, 28, 39, 42, 85, 86, 97, 99, 100, 116, 125, 126, 128, 130, 131

[56] References Cited

FOREIGN PATENT DOCUMENTS

| | | | |
|---|---|---|---|
| 3024370 | 1/1982 | Germany | G05B 9/03 |
| 3513357 | 10/1986 | Germany | G08C 25/02 |
| 3639065 | 5/1988 | Germany | G05B 23/02 |
| 3701714 | 8/1988 | Germany | G05B 23/02 |
| 3812760 | 10/1989 | Germany | F02D 41/22 |
| 4321971 | 1/1994 | Germany | G05B 9/02 |
| 4242792 | 6/1994 | Germany | F16P 3/12 |
| 4441070 | 5/1996 | Germany | G05B 9/03 |
| 03192401 | 8/1991 | Japan . | |
| 2007883 | 5/1979 | United Kingdom | G05B 9/03 |
| 2183113 | 5/1987 | United Kingdom | H02H 3/05 |
| 2249229 | 4/1992 | United Kingdom | H02H 11/00 |

OTHER PUBLICATIONS

"Multiple-Input Over-Voltage, Under-Voltage Window Comparator for Computer Power Supplies". In: IBM Technical Disclosure Bulletin, vol. 29, No. 10, Mar. 1987, p. 4516.

*Primary Examiner*—Ronald W. Leja
*Attorney, Agent, or Firm*—Spencer & Frank

[57] ABSTRACT

A safety switch arrangement having a first supply line; a first computer unit coupled to the first supply line, the first computer unit having a first operating voltage; a first pair of bidirectional lines, one of the first pair of bidirectional lines having a first switch; a first actuator coupled to the first computer unit by the first pair of bidirectional lines, the first actuator having a first switch, which has first semiconductor elements; a second supply line; a second computer unit coupled to the second supply line, the second computer unit having a second operating voltage; a second pair of bidirectional lines, one of the second pair of bidirectional lines having a second switch; a second actuator coupled to the second computer unit by the second pair of bidirectional lines, the second actuator having a second switch, which has second semiconductor elements; a working device coupled to the first and second actuators and having an operating state, the first and the second actuators controlling the operating state; and a voltage monitoring unit coupled to the first and second computer units and to the first and second switches. The voltage monitoring unit opens both the first and second switches when either the first or second operating voltage is outside a predetermined nominal value range.

16 Claims, 3 Drawing Sheets

SAFETY SWITCH ARRANGEMENT

BACKGROUND OF THE INVENTION

The invention relates to a safety switch arrangement according to German Patent Application P 44 41 070.0-32.

The dual-channel safety switch arrangement described therein has actuators which include switch-like means comprising semiconductor elements. In contrast to relays, these semiconductor elements have no contacts that are subjected to wear.

A computer unit is provided in each evaluation channel for performing the function check of the actuator, with each computer unit being connected to the actuator by way of two bidirectional supply lines. The computer units, which are preferably configured as controllers, can be disposed upstream of the actuators as standard products; this practice is inexpensive and does not require an additional outlay for circuitry. Computer units are already integrated into a number of sensors for the purpose of controlling the sensor functions. In this case, the computer units can additionally perform the functions necessary for the safety switch, further reducing the circuitry outlay for the sensor.

The computer units are connected by way of a bidirectional supply line so that they can be monitored.

The complete actuation and function monitoring of the actuators is effected centrally in the computer units. To physically separate the function monitoring from the transmission of the sensor signals, separate, bidirectional supply lines are provided from the computer unit to the actuator for transmitting the switching pulses of the sensor and for transmitting test pulses for function monitoring; this increases the operating reliability of the arrangement. The bidirectional supply lines do not only transmit the switching pulses and test pulses to the actuator, but also receive an acknowledgement message from it. Also contained in the acknowledgement message is additional information regarding whether the functions of the actuator and the supply lines are error-free. Based on the different acknowledgement messages, errors that may occur can be localized and classified quickly and reliably.

To perform function checks of the safety switch arrangement, the computer units change the switching states for a short time, and the acknowledgement messages are checked in the computer units to determine whether the functions of the evaluation channels and the actuators are error-free. This change in the switching states is effected for such a short time that the operating state of the working means does not change; in other words, the function check does not impair the operation of the working means. A further advantage of this arrangement is that the function check parameters can be set easily with the computer units.

The object of the invention is to increase the scope of the function check with the least possible circuitry outlay.

SUMMARY OF THE INVENTION

The operating voltages of the computer units are checked by the voltage-monitoring unit, which is guided to the switches in the supply lines leading to the actuators; erroneous control signals originating in the computer units due to overvoltages or undervoltages, which can lead to a dangerous breakdown of the switches, can be discovered in the process.

The function monitoring can advantageously be performed in such a way that the read-back windings no longer need to be guided back to both computer units, which reduces the circuitry outlay. The sensor is advantageously connected to each computer unit by way of a dual-channel supply line, so the signals traveling from the sensor to the computer unit can be monitored.

A further advantage is that the function check is performed independently of the sensor signal state.

BRIEF DESCRIPTION OF THE DRAWINGS

The invention is described below in conjunction with the drawings.

DETAILED DESCRIPTION OF THE PREFERRED EMBODIMENTS

Figure 1:
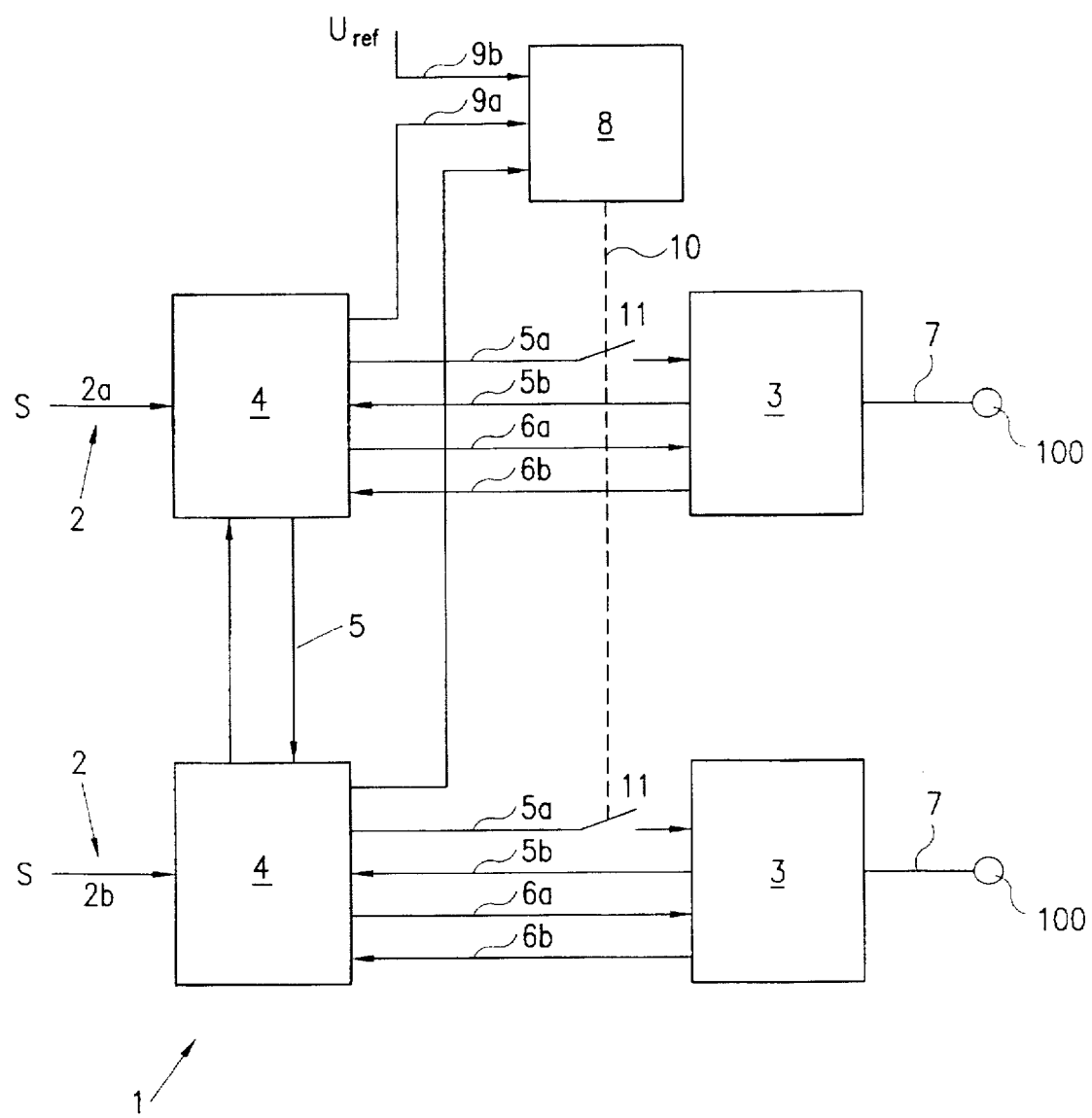
FIG. 1 is a circuit diagram of the safety switch arrangement.

FIG. 1 shows a safety switch arrangement 1 for switching on and cutting off the current supply of a working means 100. The switch-on and cutoff of the working means is effected by a sensor signal S. The sensor is preferably configured as a light barrier into whose housing the entire safety switch arrangement is integrated.

The sensor can be used, for example, in the region of the working means to monitor a protective field. It has two signal states, protective field free (sensor active) and protective field not free (sensor inactive).

The binary sensor signal S is supplied to the two evaluation channels 2 of the safety switch arrangement 1. Each evaluation channel 2 has a supply line 2a or 2b, which connects the sensor directly to an actuator 3. The actuator 3 has switch-like means comprising semiconductor elements. A computer unit 4 is disposed upstream of the actuator 3, and is configured as a controller, preferably a microcontroller. Each computer unit 4 is connected to the sensor by way of a separate supply line 2a, 2b, so the sensor signal can be monitored by the computer units 4.

The computer units 4 are coupled by way of a bidirectional supply line 5. The controllers have identical hardware, but their software is configured differently. With respect to hardware, the controllers are therefore homogeneously redundant, while the software is diverse. The computer units 4 operate in master-slave mode, with the master controlling the communication of the computer units 4. The mutual control of the computer units 4 is advantageously effected in asynchronous mode.

The actuator is coupled to the computer unit 4 by way of two bidirectional supply lines 5a, 5b and 6a, 6b so that its function can be checked. The switching pulses that correspond to the current signal state of the sensor are transmitted to the actuator 3 by way of the first supply line 5a, 5b in such a way that they can be read back. Test pulses are transmitted to the actuator 3 by way of all supply lines 5a, 5b, 6a, 6b for the purpose of checking its function. The bidirectional supply lines 5a, 5b, 6a, 6b respectively comprise a signal line 5a, 6a for transmitting information to the actuator 3, and a read-back winding 5b, 6b for sending an acknowledgement message from the actuator 3 to the computer unit 4.

Each actuator 3 has a switch output 7. The working means 100 is only actuated if both switch outputs 7 are active, that is, if both switch outputs 7 correspond to the "protective field free" signal states of the sensor.

The safety switch arrangement 1 has a voltage-monitoring unit 8, to whose inputs supply lines 9a are guided from outputs of the computer units 4. The voltage-monitoring unit 8 is preferably formed from an integrated circuit (IC). A further supply line 9b is guided from an input of the voltage-monitoring unit 8 to a reference voltage potential $U_{ref}$. A supply line 10 is guided from an output of the voltage-monitoring unit 8 to switches 11 in the signal lines 5a. The switches 11 are preferably configured as transistors.

The voltage-monitoring unit 8 is used to check whether the operating voltages of the computer units 4 are within a predetermined nominal value range. If this is not the case, the two switches 11 are opened by way of the supply line 10, and the working means 100 is subsequently deactivated. This ensures that no erroneous control signals originate from the computer units 4 due to overvoltages or undervoltages.

Figure 2:
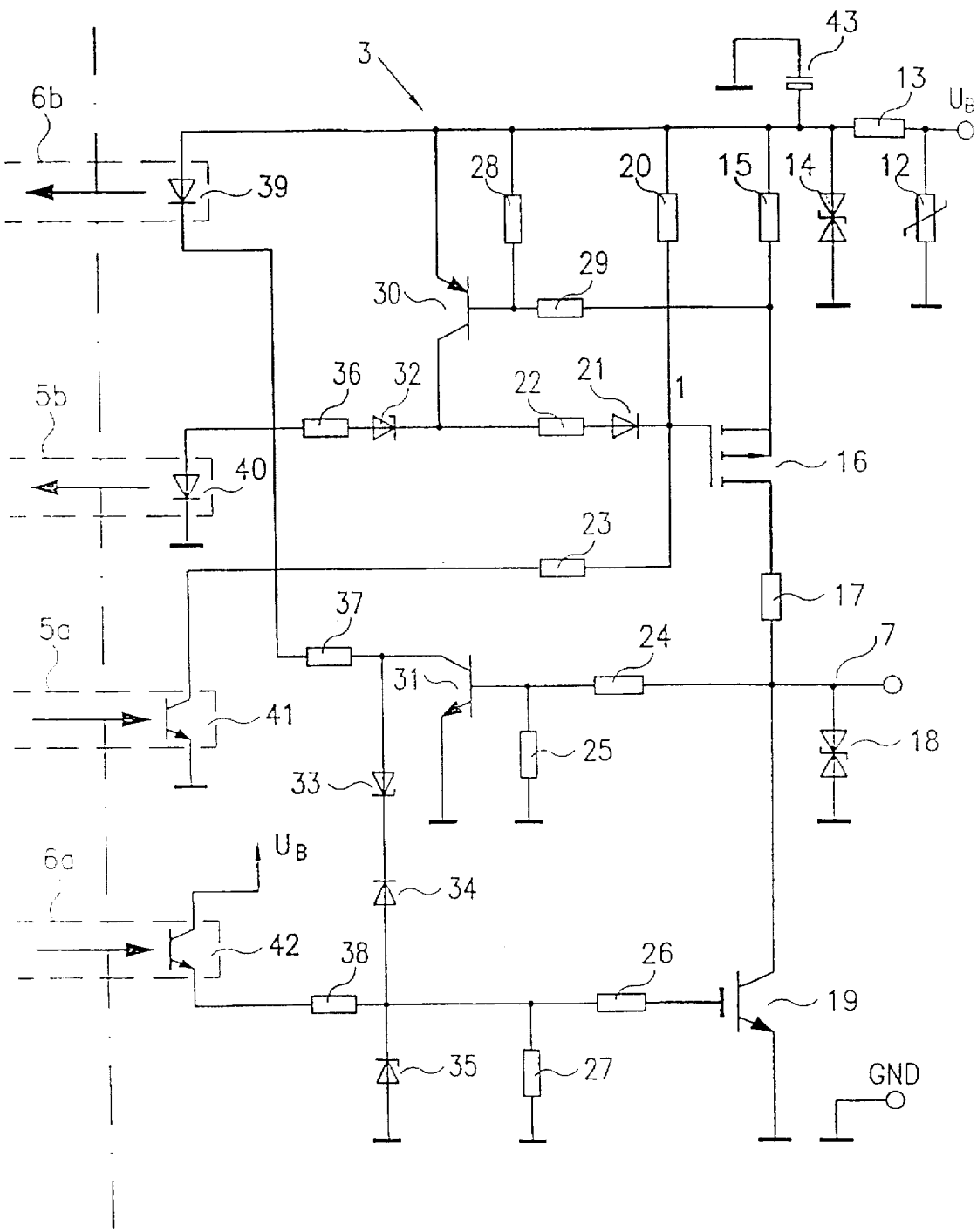
FIG. 2 is a circuit diagram of the actuator.

FIG. 2 shows a circuit diagram of an actuator 3. A varistor 12, a resistor 13 and a suppressor diode 14 are provided on the output side of the actuator 3 for protection against transient overvoltages. The resistor 13 serves in delaying overvoltage pulses in time, so the faster suppressor diode 14 does not respond before the varistor 12. A supply line leads from this overvoltage protection assembly, by way of a resistor 15, to a P-channel MOS field effect transistor 16, which forms the switch-like means. The switch-like means is guided to the switch output 7 by way of a resistor 17. A supply line also leads from the resistor 17 to a transistor 19, which is guided to ground potential GND. A suppressor diode 18 protects the transistor 19.

The transistor 16 is wired through the resistors 15 and 20 as a first constant-current source, with the current being limited to a maximum value during short circuit tests.

Like the diode 21 and resistors 22 and 23, the resistor 20 is guided to the switch-like means. Resistors 24 and 25 are guided to the switch output 7. Resistors 26 and 27 are guided to the transistor 19. Resistors 28 and 29 are switched between the resistor 15 and a transistor 30. The transistor 30 controls the transistor 16 by way of the diode 21 and the resistor 22, resulting in a second constant-current source that is guided to the read-back winding 5b by way of the diode 32.

A transistor 31 is provided for measuring the voltage at the collector of the transistor 19. In addition, the transistor 31 represents a starting current limiter for the transistor, that is, it limits the current flux of the transistor 19 in the event of a short circuit of the switch output 7 to the supply voltage $U_B$. Thus, the transistor 19 is protected from being destroyed.

In the event of an error, the switch output 7 is switched to ground potential GND by means of a Zener diode 33 and a diode 34.

Resistors 36 and 37 are disposed upstream of the transmitting elements for the read-back windings 5b, 6b. Resistors 23 and 38 are disposed downstream of the receiving elements of the signal lines 5a and 6a.

The transmitting elements for the read-back windings 6b or 5b are formed by optocouplers 39 and 40. The receiving elements for the signal lines 5a and 6a are formed by optocouplers 41 and 42.

The signal lines 5a and 6a are switched such that the transistors 16 and 19 are highly resistive in the reset state of the computer units 4. Thus, none of these transistors 16 and 19 can be destroyed by an external short circuit before the computer units 4 are in operation.

The functions of the safety switch arrangement 1 are explained below in conjunction with FIG. 3.

The function check of the evaluation channels 1 and 2 is performed independently of the current sensor state, i.e., regardless of whether the sensor is active or inactive. This is indicated by the cross-hatched surfaces in FIG. 3. The computer units 4 control the execution of the function check.

The computer units operate in master-slave mode. This means that a computer unit 4, as the master, controls communication by way of the supply lines 5. Communication is effected in the form of a two-bit parallel communication, i.e., each computer unit 4 has a transmitting and receiving line 5.

The function check of the computer units 4 is effected mutually by way of a time-out function. If a computer unit 4 does not respond in time to a signal of the other computer unit 4, the missing response is interpreted as an error.

Figure 3:
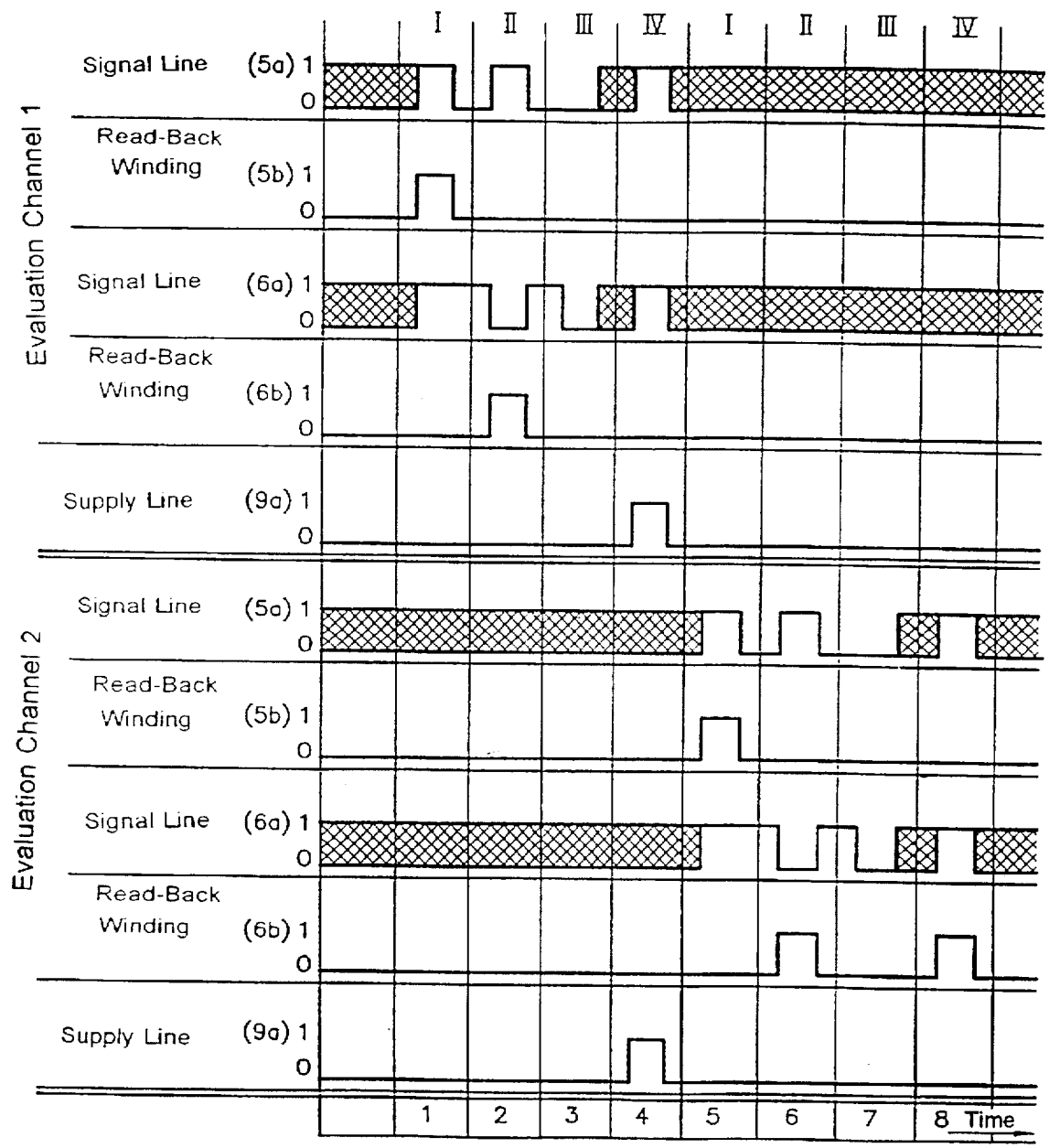
FIG. 3 is a timing diagram of the signal states of the bidirectional supply lines.

As can be seen from FIG. 3, the function check is performed with a temporal offset in the two evaluation channels. The release of a computer unit 4 to perform the function check is advisably effected by the master. For the sake of a clear overview, the time delay between two function checks is not shown in FIG. 3.

The function check comprises test segments I, II, III, and IV. During the first three test segments I, II, and III, a check is made to determine whether a disturbance is present in the actuator 3 itself. The function of the voltage-monitoring unit 8 and the switches 11 is checked in test segment IV.

The signal sequences shown in FIG. 3 represent the case in which no errors occur.

The signal lines 5a and 6a are activated in test segment I. If no errors are present, the read-back winding 5b must assume the active state, and the read-back winding 6b must assume the inactive state during this short circuit test.

To limit the current flux during the short circuit test, the transistor 16 is wired through the resistors 15 and 20 as a constant-current source. A capacitor 43 is also provided as an energy store, so this setup does not stress the supplying network component.

In test segments II and III the signal lines 5a and 6a are activated with a temporal offset. In the case of no errors, the read-back winding 5b remains in the inactive state, while the read-back winding 6b is only inactive during test segment III, but not during test segment II.

In the case involving errors, switching states which deviate from the states illustrated in FIG. 3 result for the read-back windings 5b and 6b during test segments I, II, and III.

In this case the transistors 16 and 19 can become shorted or be highly resistive. A short to ground potential GND or the supply voltage $U_B$ can likewise be present. Finally, the voltage-monitoring unit 8 can be defective, or a cross of the switch outputs 7 with respect to one another can be present.

If, in the case involving errors, the transistor 16 is shorted and can no longer be switched off, once the transistor 19 is switched on, current flows until the resistor 17 forming a fuse responds and separates the switch output 7 from the supply voltage $U_B$. Thus, before the fuse responds, the evaluation channel 2 having the disturbance can still be transferred into the safe state, that is, it can switch off the working means.

To distinguish a short circuit of the switch output 7 determined with $U_B$ from the other cases involving errors, a further test segment, not shown in FIG. 3, can be added. During this test segment, the transistors 16 and 19 are switched to be highly resistive. The optocoupler 39 is used to check whether voltage is being applied to the switch output 7.

If this is not the case, no external short circuit is present, and the switch output 7 is switched to ground potential GND by way of the transistor 19.

The voltage monitoring of the computer unit 4 is checked during test segment IV. For this purpose, the computer unit 4 simulates an overvoltage pulse (signal lines 5a and 6a are active), whereupon the supply line 9a is activated in the error-free case.

The switching states of the signal lines 5a and 6a are changed briefly for cyclical function monitoring. The individual time intervals "1" through "8" are in a range of 50–150 µs. These time intervals are short enough that the changes in the switching states which are effected on the signal lines 5a and 6a during these intervals cannot effect a change in the operating state of the working means due to its inertia. The rerun time of the cyclical function monitoring is in a range of 5–15 ms, and preferably 10 ms. A particular advantage is that the cyclical function monitoring is controlled by the computer units 4. The rerun time of the cyclical function monitoring can be varied using the software in the computer units 4, for example to avoid overloading the computer units 4.

What is claimed is:

1. A safety switch arrangement comprising:
   a first supply line;
   a first computer unit coupled to said first supply line, said first computer unit having a first operating voltage;
   a first pair of bidirectional lines, one of said first pair of bidirectional lines having a first switch;
   a first actuator coupled to said first computer unit by said first pair of bidirectional lines, said first actuator transmitting information to said first computer unit using said first pair of bidirectional lines, said first actuator having a first switching means having first semiconductor elements;
   a second supply line;
   a second computer unit coupled to said second supply line, said second computer unit having a second operating voltage;
   a second pair of bidirectional lines, one of said second pair of bidirectional lines having a second switch;
   a second actuator coupled to said second computer unit by said second pair of bidirectional lines, said second actuator transmitting information to said second computer unit using said second pair of bidirectional lines, said second actuator having a second switching means having second semiconductor elements;
   a working means coupled to said first and second actuators, said working means having an operating state, said first and said second actuators controlling said operating state;
   a voltage monitoring unit coupled to said first and second computer units and to said first and second switches, said voltage monitoring unit opening said first and second switches when either said first or second operating voltage is outside a predetermined nominal value range.

2. A safety switch arrangement as in claim 1, wherein switching pulses are transmitted from said first and second computer units to said first and second actuators, wherein said switching pulses are read back from said first and second actuators to said first and second computer units, such that a switching process is initiated.

3. A safety switch arrangement as in claim 1, wherein test pulses are transmitted from said first and second computer units to said first and second actuators, wherein said test pulses are read back from said first and second actuators to said first and second computer units, such that an actuator function check is initiated.

4. A safety switch arrangement as in claim 1, wherein switching states of said first and second switching means are changed by said first and second computer units, such that said operating state of said working means is not changed, and such that a function check is performed.

5. A safety switch arrangement as in claim 4, further comprising:
   a sensor supplying a sensor signal to said first and second supply lines, said function check being performed independently of said sensor signal.

6. A safety switch arrangement as in claim 4, said function check comprising four consecutive test segments for checking said first and second actuators and said first and second operating voltages.

7. A safety switch arrangement as in claim 6, said four consecutive test segments comprising first, second, third, and fourth consecutive test segments;
   said first, second, and third consecutive test segments checking said first and second actuators;
   said fourth consecutive test segment checking said first and second operating voltages.

8. A safety switch arrangement as in claim 1, further comprising:
   a sensor supplying a sensor signal to said first and second supply lines.

9. A safety switch arrangement as in claim 1, wherein said first switch comprises a first transistor, and said second switch comprises a second transistor.

10. A safety switch arrangement as in claim 1, further comprising a third bidirectional line for coupling said first and second computer units, said first and said second computer units operating in a master-slave mode.

11. A safety switch arrangement as in claim 1, wherein said first switching means comprises a MOS field effect transistor.

12. A safety switch arrangement as in claim 11,
   said first switching means further comprising a first constant-current source;
   said first constant-current source comprising said MOS field effect transistor and two resistors;
   said MOS field effect transistor coupled to said two resistors.

13. A safety switch arrangement as in claim 11,
   said first switching means further comprising a second constant-current source;
   said second constant-current source comprising said MOS field effect transistor, a transistor, a resistor, and a diode;
   said transistor coupled to said resistor and said diode;
   said MOS field effect transistor coupled to said resistor and said diode;
   said transistor controlling said MOS field effect transistor through said resistor and said diode.

14. A safety switch arrangement as in claim 1, wherein said second switching means comprises a MOS field effect transistor.

15. A safety switch arrangement as in claim 14,
   said second switching means further comprising a first constant-current source;
   said first constant-current source comprising said MOS field effect transistor and two resistors;
   said MOS field effect transistor coupled to said two resistors.

16. A safety switch arrangement as in claim 14, said second switching means further comprising a second constant-current source;

said second constant-current source comprising said MOS field effect transistor, a transistor, a resistor, and a diode;

said transistor coupled to said resistor and said diode;

said MOS field effect transistor coupled to said resistor and said diode;

said transistor controlling said MOS field effect transistor through said resistor and said diode.

\* \* \* \* \*